United States Patent
Ma et al.

(10) Patent No.: US 12,222,203 B2
(45) Date of Patent: Feb. 11, 2025

(54) FULLY DECOUPLED THREE-AXIS MEMS GYROSCOPE

(71) Applicant: AAC Kaitai Technologies (Wuhan) CO., LTD, Hubei (CN)

(72) Inventors: Zhao Ma, Shenzhen (CN); Shitao Yan, Shenzhen (CN); Zhan Zhan, Shenzhen (CN); Xiao Kan, Shenzhen (CN); Shan Yang, Shenzhen (CN); Hongtao Peng, Shenzhen (CN); Yang Li, Shenzhen (CN); Kahkeen Lai, Singapore (SG); Veronica Tan, Singapore (SG)

(73) Assignee: AAC Kaitai Technologies (Wuhan) CO., LTD, Wuhan (CN)

( * ) Notice: Subject to any disclaimer, the term of this patent is extended or adjusted under 35 U.S.C. 154(b) by 273 days.

(21) Appl. No.: 18/088,826

(22) Filed: Dec. 27, 2022

(65) Prior Publication Data

US 2024/0093996 A1    Mar. 21, 2024

Related U.S. Application Data

(63) Continuation of application No. PCT/CN2022/124697, filed on Oct. 11, 2022.

(30) Foreign Application Priority Data

Sep. 20, 2022  (CN) .......................... 202211144389.8

(51) Int. Cl.
*G01C 19/5712* (2012.01)
(52) U.S. Cl.
CPC ................................. *G01C 19/5712* (2013.01)

(58) Field of Classification Search
CPC .................................................. G01C 19/5712
See application file for complete search history.

(56) References Cited

U.S. PATENT DOCUMENTS

| 10,330,471 | B2* | 6/2019 | Zhang | G01C 19/5684 |
| 2009/0100930 | A1* | 4/2009 | Coronato | G01C 19/5712 73/504.12 |
| 2012/0055248 | A1* | 3/2012 | Hammer | G01C 19/5712 73/504.12 |
| 2014/0230548 | A1* | 8/2014 | Coronato | G01C 19/5712 73/504.12 |
| 2015/0068308 | A1* | 3/2015 | Blomqvist | B81B 7/0058 73/504.12 |
| 2016/0341551 | A1* | 11/2016 | Cook | G01C 19/5733 |

(Continued)

*Primary Examiner* — David J Bolduc
(74) *Attorney, Agent, or Firm* — W&G Law Group (57) ABSTRACT

Provided is a fully decoupled MEMS gyroscope, including an anchor point unit, a sensing unit elastically connected to the anchor point unit, and a driving unit configured to drive the sensing unit to move. The anchor point unit includes a center anchor point subunit located at a center of a rectangle and four side anchor points. The driving unit includes four driving members located on four sides of the rectangle. The sensing unit includes two X mass blocks symmetrically arranged in two avoiding intervals, two Y mass blocks symmetrically arranged in the other two avoiding intervals, four Z mass blocks respectively located at an outer side of each driving member, and four Z detection decoupling members respectively located at an outer side of each Z mass block. The X mass blocks and the Y mass blocks are respectively connected to each side anchor point.

10 Claims, 6 Drawing Sheets

(56) References Cited

U.S. PATENT DOCUMENTS

| | | | |
|---|---|---|---|
| 2017/0284804 A1* | 10/2017 | Gattere | G01C 25/00 |
| 2018/0172446 A1* | 6/2018 | Prikhodko | G01C 19/567 |
| 2019/0145772 A1* | 5/2019 | Acar | G01C 19/5712 |
| | | | 73/504.12 |
| 2020/0096337 A1* | 3/2020 | Senkal | G01C 19/5733 |
| 2023/0228570 A1* | 7/2023 | Fedeli | B81B 7/0048 |
| | | | 73/504.12 |
| 2023/0266124 A1* | 8/2023 | Ma | G01C 19/5747 |
| 2023/0266125 A1* | 8/2023 | Ma | G01C 19/5747 |

* cited by examiner

FIG. 6

FULLY DECOUPLED THREE-AXIS MEMS GYROSCOPE

TECHNICAL FIELD

The present application relates to the technical field of MEMS sensors, in particular to a fully decoupled three-axis MEMS gyroscope.

BACKGROUND

Micro-Electro-Mechanical System (MEMS) gyroscopes are miniature angular velocity sensors produced by applying micromachining technologies and microelectronic technologies.

A MEMS out-of-plane swing gyroscope is a typical representative of a MEMS out-of-plane detection gyroscope. The MEMS swing gyroscope swings around an axis of a vertical mass block in a drive mode. When an angular velocity Ω is applied, the gyroscope transfers energy to the sensitive mode due to the Coriolis Effect, causing a vibrating disk to swing out-of-plane under relative drive. A size of Ω may be obtained by detecting the displacement of the out-of-plane swing.

The three-axis MEMS gyroscope in the related art often suffers from weak coupling of the gyroscope mass structure, resulting in the sense modes of the three axes being coupled to each other, and the errors will be superimposed, resulting in excessive gyroscope errors.

In order to overcome the above-mentioned defects in the prior art, a fully decoupled three-axis MEMS gyroscope needs to be developed to achieve XYZ three-axis independent detection, and the three axes thereof can both achieve a differential detection, thereby effectively reducing the influence of an acceleration impulse and a quadrature error.

SUMMARY

An object of the present application is to provide a fully decoupled three-axis gyroscope, so as to solve the problem of weak coupling and excessive gyroscope errors in the mass structures of the gyroscope in the related art.

The technical solution of the present application is as follows: a fully decoupled three-axis MEMS gyroscope, comprising:

an anchor point unit, comprising:
 an anchor point subunit located at a center of a rectangle; and
 four side anchor points respectively located between the central anchor point subunit and four sides of the rectangle and spaced apart from the central anchor subunit;
a driving unit coupled with a sensing unit and configured to drive the sensing unit to move, comprising:
 four driving members respectively located at four sides of the rectangle, and annularly and symmetrically arranged around a center of the rectangle; one end of each driving member close to the center of the rectangle is elastically connected to the central anchor point subunit; an avoiding interval is formed between adjacent driving members, and four side anchor points are respectively located in the avoiding intervals; and
the sensing unit elastically connected to the anchor point unit, comprising: two X mass blocks symmetrically and oppositely arranged in two of the avoiding intervals and elastically connected to two of the driving member;
 two Y mass blocks symmetrically and oppositely arranged in the other two of the avoiding intervals and elastically connected to two of the driving member;
 four Z mass blocks respectively located on an outer side of each driving member and elastically connected to the adjacent driving member; and
 four Z detection decoupling members respectively located on an outer side of each Z mass block and elastically connected to the adjacent Z mass block;
 wherein the adjacent Z detection decoupling members are elastically connected; an end of each X mass block close to the center of the rectangular and an end of each Y mass block close to the center of the rectangular are both elastically connected to the central anchor point subunit, and a central portion of each X mass block and a central portion of each Y mass block are elastically connected to a corresponding side anchor point, respectively.

In one embodiment, the central anchor point subunit comprises a central anchor located at the center of the rectangle; a coupling structure surrounded and flexibly connected to the central anchor point, comprising an inner coupling ring nested on the central anchor point and an outer coupling ring nested on the inner coupling ring; and four first anchor points annularly arranged around the coupling structure and spaced apart from the coupling structure; wherein an inner side of the inner coupling ring is extended along a direction of a central line of the rectangle to form two inner coupling beams connected to the central anchor point; an inner side of the outer coupling ring is extended along a direction perpendicular to a straight line where the two inner coupling beams are located to form two outer coupling beams connected to the inner coupling ring; the four first anchor points are respectively located at an inner side of each driving member, and an outer wall of one end of each driving member close to each first anchor point is extended outwards to form a first connecting beam for connecting to the first anchor point.

In one embodiment, an outer side of each outer coupling ring close to each X mass block and each Y mass block is extended towards the corresponding X mass block and Y mass block to form a second flexible beam, and an end of each second flexible beam away from each outer coupling ring is connected to the corresponding X mass block and Y mass block.

In one embodiment, the four side anchor points are respectively located at middle positions of the corresponding X mass blocks and Y mass blocks; each X mass block and each Y mass block are provided with a first connecting groove at the corresponding side anchor point; the X mass blocks and the Y mass blocks are each extended from the first connecting groove to form a first flexible beam connected to the corresponding side anchor point, and the first flexible beam is bent in a lengthwise direction of the first connecting groove.

In one embodiment, outer walls of two sides of each driving member are respectively extended towards each X mass block and each Y mass block to form a third flexible beam connected to the X mass block or the Y mass block.

In one embodiment, two sides of an outer wall of each driving member close to one end of the corresponding Z mass block are extended towards the Z mass block to form a first guide beam, and an end of the first guide beam away from the driving member is connected to the Z mass block.

In one embodiment, the anchor point unit further comprises four second anchor points respectively provided between each Z mass block and a corresponding driving member, wherein an outer wall of one end of each driving member close to each Z mass block is extended outwards to form a second connecting beam connected to each second anchor point.

In one embodiment, an outer wall of one end of each Z detection decoupling member close to each Z mass block is extended outwards to form a third connecting beam connected to the Z mass block; the anchor point unit further comprises decoupling member anchor points respectively located at two ends of each Z detection decoupling member, and two sides of each Z detection decoupling member is extended outwards to form a second guide beam having a bending portion and connected to the decoupling member anchor points.

In one embodiment, the anchor point unit further comprises corner anchor points respectively located between every two adjacent Z detection decoupling members, and two adjacent Z detection decoupling members are extended to form a fourth flexible beam connected to the corner anchor point located between the two adjacent Z detection decoupling members.

In one embodiment, the driving members and the Z detection decoupling members are all frame structures; the fully decoupled three-axis MEMS gyroscope further comprises an in-plane driving transducer embedded in each frame structure of each driving member, and an in-plane Z detection transducer embedded in each frame structure of each Z detection decoupling member; the fully decoupled three-axis MEMS gyroscope further comprises out-of-plane X detection transducers spaced apart from the X mass blocks, and out-of-plane Y detection transducers spaced apart from the Y mass blocks.

In the Sense Mode:

The X mass blocks respond to an in-plane angular velocity ω along an X-axis (0°) direction. According to the Coriolis principle, the angular velocity ω generates a Coriolis force along a Z-axis (orthogonal to the plane) direction, which forces the gyroscope to generate a vibration in an X-axis sense mode, and makes the X mass blocks turn out of plane. Finally, the magnitude of the angular velocity ω may be obtained by detecting a vibration displacement of each X mass block along the Z-axis direction. For the X mass blocks, the movement directions of the two X mass blocks in the sense mode are opposite to form a differential detection. Besides, the movement directions of the portions of each X mass block at an inner side and an outer side of each side anchor point are opposite to each other in the sense mode to form a differential detection.

The Y mass blocks respond to an in-plane angular velocity ω along a Y-axis (90°) direction. According to the Coriolis principle, the angular velocity ω generates a Coriolis force along a Z-axis (orthogonal to the plane) direction, which forces the gyroscope to generate a vibration in a Y-axis sense mode, and makes the Y mass blocks turn out of plane. Finally, the magnitude of the angular velocity ω may be obtained by detecting a vibration displacement of each Y mass block along the Z-axis direction. For the Y mass blocks, the movement directions of the two Y mass blocks in the sense mode are opposite to form a differential detection. Besides, the movement directions of the portions of each Y mass block at an inner side and an outer side of the side anchor point are opposite to each other in the sense mode to form a differential detection.

The Z mass blocks respond to an in-plane angular velocity ω along a Z-axis (orthogonal to the plane) direction. According to the Coriolis principle, the angular velocity ω generates a Coriolis force in a direction of 45°/135°, which forces the gyroscope to generate a vibration in a Z-axis sense mode, and makes the Z mass move along a movement direction perpendicular to the driving mode. Finally, the magnitude of the angular velocity ω may be obtained by detecting a vibration displacement of the Z mass blocks along the direction of 45°/135°. For the Z mass blocks, the two Z mass blocks located at 45° have opposite movement directions in the sense mode, the two Z mass blocks located at 135° have opposite movement directions in the sense mode, and the four Z mass blocks form a differential detection in the sense mode.

The present application has the following beneficial effects.

1. The X mass blocks, the Y mass blocks and the Z mass blocks are all arranged symmetrically, thereby facilitating the differential detection.
2. The driving members forms a differential drive in the driving mode, which can effectively improve the stability and shock resistance of the gyroscope drive.
3. The X mass blocks, the Y mass blocks, and the Z mass blocks can respectively realize an anti-phase vibration in a sense mode, thereby realizing a differential gyroscope detection, and effectively eliminating the effects of acceleration shocks and quadrature errors.
4. The gyroscope is independently detected at angular velocities of three axes X, Y and Z, thereby effectively avoiding the coupling of detection errors in different axes, and improving the detection precision of the gyroscope.
5. The X mass blocks and the Y mass blocks are elastically connected to the anchor points through the decoupling structure, which effectively reduces the coupling between the different modal motions of the mass blocks, avoids an interference between different modal motions, reduces the displacement of the non-moving mass blocks, and reduces the orthogonal error, which is beneficial to the bias stability of the sensor.
6. The Z detection mass is connected by a coupling beam, which effectively suppresses the detection parasitic mode and improves the detection accuracy of the gyroscope detection.

DETAILED DESCRIPTION OF THE EMBODIMENTS

The present application will be further described below with reference to the accompanying drawings and embodiments.

Figure 1:
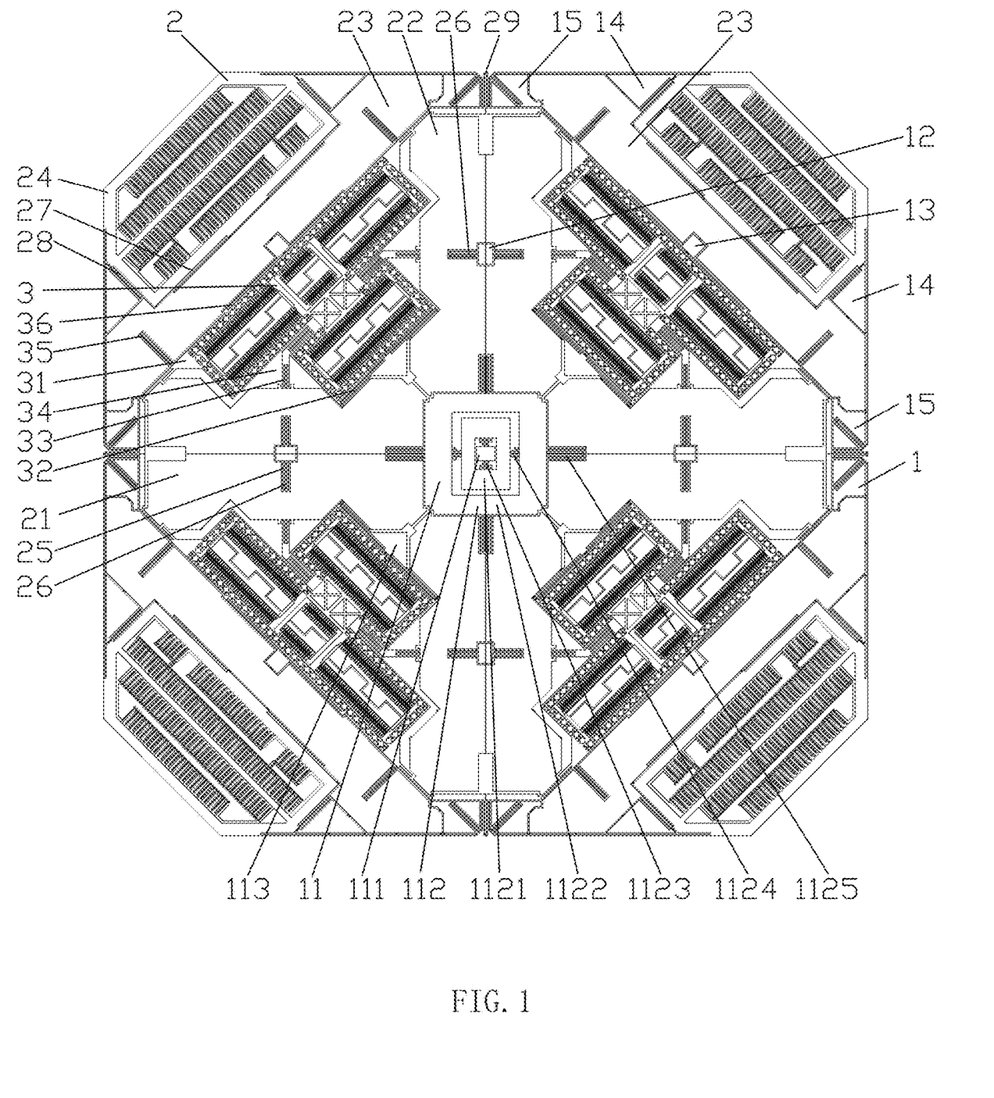
FIG. 1 is a view of a plane structure of a MEMS gyroscope according to an embodiment of the present application.

As shown in FIG. 1, a fully decoupled three-axis Micro-Electro-Mechanical System (MEMS) gyroscope includes an anchor point unit 1, a sensing unit 2 elastically connected to the anchor point unit 1, and a driving unit 3 coupled with the sensing unit 2 and driving the sensing unit 2 to move.

The anchor point unit 1 includes a central anchor point subunit 11 located at a center of a rectangle and four side anchor points 12 respectively located between the central anchor subunit 11 and four sides of the rectangle and spaced apart from the central anchor subunit 11.

The driving unit 3 includes four driving members 31 respectively located at four sides of the rectangle, and annularly and symmetrically arranged around a center of the rectangle. That is, the four driving members 31 are respectively located at an angle of 45°/135°, and one end of each driving member 31 close to the center of the rectangle is elastically connected to the central anchor subunit 11. An avoiding interval is formed between two adjacent driving members 31, and four side anchor points 12 are respectively located in each avoiding interval.

The sensing unit 2 includes two X mass blocks 21 symmetrically and oppositely arranged in the two of the avoiding intervals and elastically connected to two of the driving members 31, two Y mass blocks 22 symmetrically and oppositely arranged in the other two of the avoiding intervals and elastically connected to the side anchor point 12 and the driving member 31, four Z mass blocks 23 located on an outer side of each driving member 31 and elastically connected to the adjacent driving members 31, and four Z detection decoupling members 24 respectively located on an outer side of each Z mass block 23 and elastically connected to the adjacent Z mass block 23. The adjacent Z detection decoupling members 24 are elastically connected. An end of each X mass block 21 close to the center of the rectangular and an end of each Y mass block 22 close to the center of the rectangular are both elastically connected to the central anchor point subunit 11, and a central portion of each X mass block 21 and a central portion of each Y mass block 22 are elastically connected to a corresponding side anchor point 12, respectively.

In this embodiment, as shown in FIG. 1, the X mass blocks 21 and the Y mass blocks 22 are respectively located on a diagonal of the rectangle. The X mass blocks 21 are located in an X-axis (0°) direction, and the Y mass blocks 22 are located in a Y-axis (90°) direction. The edges at an outer side of each driving member 31 correspond to four sides of the rectangle. The Z mass blocks 23 and the Z detection decoupling members 24 are all located at the outer side of the rectangle, and are located at a direction of 45°/135°.

As shown in FIG. 1, the central anchor subunit 11 includes a central anchor point 111 located at the center of the rectangle, coupling structures 112 surrounded and flexibly connected to the central anchor point 111, and four first anchor points 113 annularly arranged around the coupling structure 112 and spaced apart from the coupling structures 112.

Specifically, each coupling structure 112 includes an inner coupling ring 1121 nested outside the central anchor point 111 and an outer coupling ring 1122 nested outside the inner coupling ring 1121. An inner side of the inner coupling ring 1121 is extended along a direction of a central line of the rectangle to form two inner coupling beams 1123 connected to the central anchor point 111. The inner coupling beams 1123 have a degree of freedom of out-of-plane inversion. An inner side of the outer coupling ring 1122 is extended along a direction perpendicular to a straight line where the two inner coupling beams 1123 are located to form two outer coupling beams 1124 connected to the inner coupling ring 1121. The outer coupling beams 1124 have a degree of freedom of out-of-plane inversion. In this embodiment, the inner coupling beams 1123 are extended in a direction of 90°, and the outer coupling beams 1124 are extended in a direction of 0°.

An outer side of each outer coupling ring 1122 close to each X mass block 21 and each Y mass block 22 is extended towards the corresponding X mass block 21 and Y mass block 22 respectively to form a second flexible beam 1125. An end of each second flexible beam 1125 away from each outer coupling ring 1122 is connected to the corresponding X mass block 21 and Y mass block 22. Specifically, the second flexible beams 1125 are extended along a direction of 0°/90° to be connected to each X mass block 21 and each Y mass block 22, respectively. The second flexible beams 1125 have a degree of freedom of in-plane rotation and out-of-plane inversion.

Four first anchor points 113 are respectively located at an inner side of each driving member 31. Specifically, the four first anchor points 113 are respectively located at a direction of 45°/135°. An outer wall of one end of the driving member 31 close to each first anchor point 113 is extended outwards to form a first connecting beam 32 connected to each first anchor point 113. The first connecting beams 32 have a degree of freedom in in-plane directions of 45°/135° to be close to or far away from the center of the rectangular. Specifically, in this embodiment, a gap is formed between each first anchor point 113 and the corresponding driving member 31, and each first connecting beam 32 is located in the gap between each driving member 31 and each first anchor point 113.

The four side anchor points 12 are respectively located at middle positions of the corresponding X mass blocks 21 and Y mass blocks 22. Specifically, the four side anchor points 12 are respectively located at a direction of 0°/90°. The X mass block blocks 21 and the Y mass block blocks 22 are each provided with a first connecting groove 25 at a corresponding side anchor point 12. The X mass block blocks 21 and the Y mass block blocks 22 are each extended from the first connecting groove 25 to form a first flexible beam 26 connected to the corresponding side anchor point 12. Each first flexible beams 26 are bent towards a length direction of each first connecting groove 25, and the first flexible beams 26 have a degree of freedom of in-plane rotation and out-of-plane inversion.

Outer walls of two sides of each driving member 31 are respectively extended towards each X mass block 21 and each Y mass block 22 to form a third flexible beam 33 connected to the X mass block 21 or the Y mass block 22. The third flexible beams 33 have a degree of freedom of in-plane rotation and out-of-plane inversion. Specifically, a gap 34 is formed between each driving member 31 and each X mass block 21 each Y mass block 22, respectively. The third flexible beams 33 are located in the gap 34 between each driving member 31 and each X mass block 21 or each Y mass block 22.

Two sides of an outer wall of one end of each driving member 31 close to the corresponding Z mass block 23 are extended towards the Z mass block 23 to form a first guide beam 35. An end of each first guide beam 35 away from the driving member 31 is connected to each Z mass block 23, and the first guide beams 35 have a degree of freedom perpendicular to the movement direction of the corresponding driving members 31.

The anchor point unit 1 further includes four second anchor points 13 respectively arranged between each Z mass block 23 and a corresponding driving member 31. An outer wall of one end of each driving member 31 close to the Z mass block 23 is extended outwards to form a second connecting beam 36 connected to the second anchor point 13. The second connecting beams 36 have a degree of freedom in the same direction as the corresponding first connecting beam 32. Specifically, in this embodiment, one end of each Z mass block 23 close to the corresponding driving member 31 is provided with an empty groove. A gap is formed between each Z mass block 23 and each driving member 31, and each gap is communicated with each empty groove provided by each Z mass block 23. Each second anchoring point 13 is located in each empty groove, and each second connecting beam 36 is located in each gap between the Z mass block 23 and the driving member 31.

An outer wall of each Z detection decoupling member 24 close to one end of each Z mass block 23 is extended outwards to form a third connecting beam 27 connected to each Z mass block 23. The third connecting beams 27 have a degree of freedom in the same direction as the corresponding first connecting beam 32 and second connecting beam 36. Specifically, in this embodiment, each Z detection decoupling member 24 is spaced from the corresponding Z mass block 23 to form a gap, and each third connecting beam 27 is located in each gap between the Z detection decoupling member 24 and the Z mass block 23.

The anchor point unit 1 further includes decoupling member anchors 14 respectively located at two ends of each Z detection decoupling member 24. Two sides of each Z detection decoupling member 24 are extended outwards to form a second guide beam 28 having a bending portion and connected to the decoupling member anchors 14. The second guide beams 28 have a degree of freedom as the corresponding first guide beams 35.

The anchor point unit 1 further includes corner anchor points 15 respectively located between every two adjacent Z detection decoupling members 24. The two adjacent Z detection decoupling members 24 are extended to form a fourth flexible beam 29 connected to the corner anchor point 15 located therebetween, and the fourth flexible beam 29 has a degree of freedom of in-plane rotation.

Figure 6:
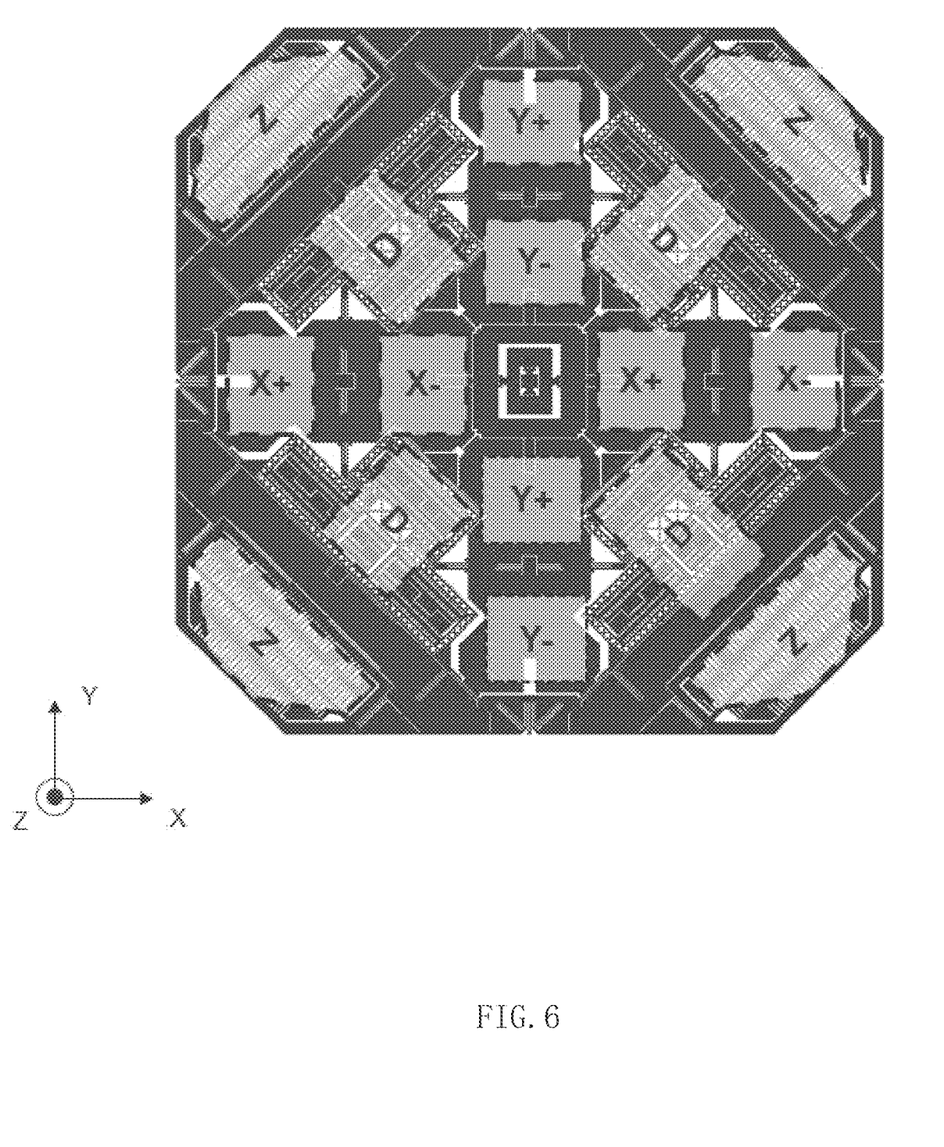
FIG. 6 is a top view of detection transducers and in-plane driving transducers in the MEMS gyroscope according to an embodiment of the present application.

As shown in FIGS. 1 and 6, the driving members 31 are all a frame structure. The fully decoupled three-axis MEMS gyroscope in this embodiment further includes an in-plane driving transducer embedded in the frame structure of each driving member 31 and configured to drive the driving member 31 to vibrate.

The Z detection decoupling members 24 are also a frame structure, and the fully decoupled three-axis MEMS gyroscope of the present embodiment further includes an in-plane Z detection transducer embedded inside the frame structure of each Z detection decoupling member.

The fully decoupled three-axis MEMS gyroscope in this embodiment further includes an out-of-plane X detection transducer spaced apart from each X mass block 21. Specifically, the out-of-plane X detection transducer includes an X+ detection transducer and an X− detection transducer, which may be specifically arranged above or below each X mass block 21. Likewise, the fully decoupled three-axis MEMS gyroscope of the present embodiment further includes an out-of-plane Y detection transducer spaced apart from each Y mass block 22. Specifically, the out-of-plane Y detection transducer includes a Y+ detection transducer and a Y− detection transducer, and may also be provided above or below each Y mass block 22.

In the present application, each driving member 31 is connected to an anchor region through the flexible first connecting beam 32 and the flexible second connecting beam 36. The first connecting beams 32 and the second connecting beams 36 can provide an in-plane one-way degree of freedom. Each X mass block 21 and each Y mass block 22 are respectively connected to the side anchor points 12 through the first flexible beams 26, and are connected to the outer coupling rings 1122 through the second flexible beams 1125, and are connected to the driving members 31 through the third flexible beams 33. The first flexible beams 26, the second flexible beams 1125 and the third flexible beams 33 can provide a degree of freedom of in-plane rotation and out-of-plane inversion. Each Z mass block 23 is connected to each driving member 31 through the first guide beam 35, and the first guide beams provide a single degree of freedom for the Z mass blocks 23 to move perpendicular to the movement direction of the driving member 31. Each Z detection decoupling member 24 is connected to each Z mass block 23 by the third connecting beam 27, and the third connecting beams 27 provide a single degree of freedom for the Z detection decoupling member 24 to be parallel to the movement direction of the driving member 31.

The gyroscope of the present application has four modes during operation, one is a drive mode, and the other three modes are X-axis, Y-axis and Z-axis sense modes respectively. The principle of angular velocity sensitivity of the gyroscope according to the present application will be described below in combination with the working modes of the gyroscope according to the present application.

Figure 2:
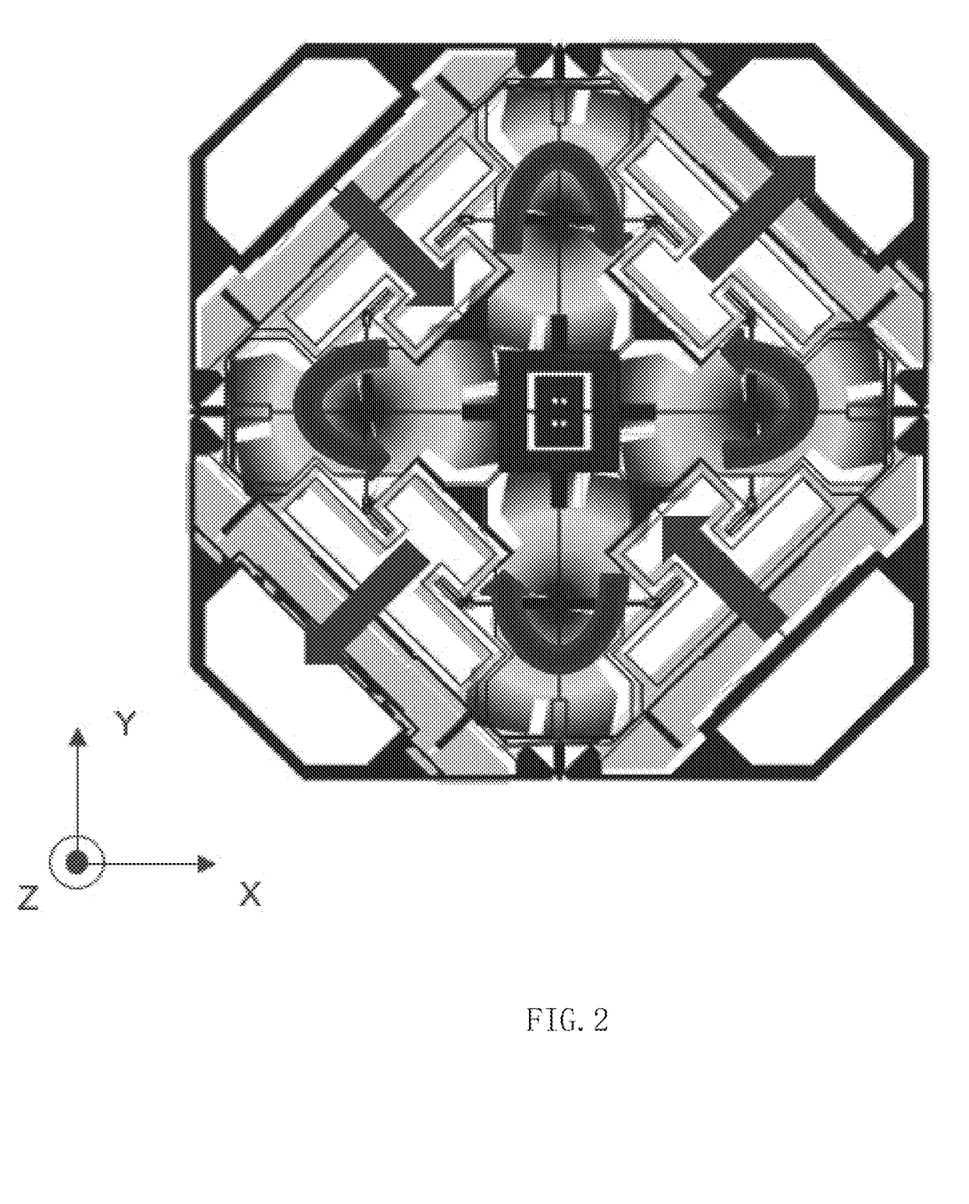
FIG. 2 is a view of the MEMS gyroscope in a drive mode according to an embodiment of the present application.

As shown in FIG. 2, in the driving mode of the gyroscope of the embodiment of the present application, the two driving members 31 in the direction of 45° move in a direction away from an axial center in the plane. The two driving members 31 in the direction of 135° move in a direction close to the axial center in the plane. The movement directions of the four driving members 31 form a differential form. Each driving member 31 drives the four Z mass blocks 23 to correspondingly move in a direction of 45° in the plane away from the axis, or move in a direction of 135° in the plane close to the axis. The movement directions of the four Z mass blocks 23 forms a differential form. Meanwhile, the driving members 31 drive the X mass blocks 21 to rotate in a tangential direction of 90° in a plane around the corresponding side anchor points 12, and drive the Y mass blocks 22 to rotate in a tangential direction of 0° in a plane around the corresponding side anchor points 12. The movement directions of the two X mass blocks 21 and the movement directions of the two Y mass blocks 22 form a differential mode respectively.

Figure 3:
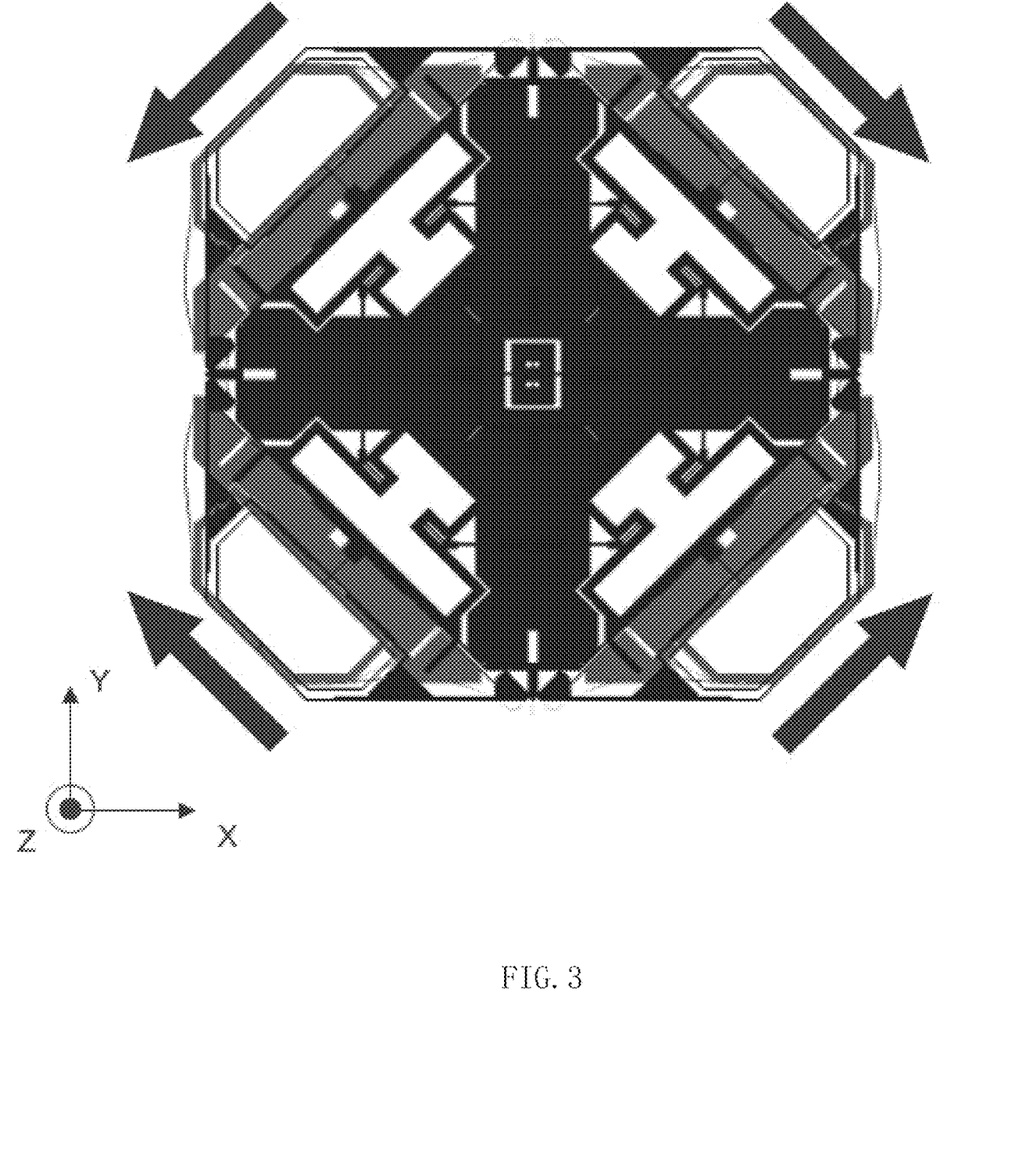
FIG. 3 is a view of the MEMS gyroscope in a Z-axis sense mode according to an embodiment of the present application.

As shown in FIG. 3, when the gyroscope of the present application is subjected to an angular velocity ω in a direction of the Z axis (orthogonal to the plane), according to the Coriolis principle, the angular velocity ω generates a Coriolis force in the direction of 45°/135°, and the Coriolis force forces the gyroscope to generate a vibration in a Z-axis sense mode, so that the Z mass blocks 23 move along a movement direction perpendicular to the driving mode. Specifically, the two Z mass blocks 23 located at 45° have opposite movement directions in the sense mode, and the two Z mass blocks 23 located at 135° have opposite movement directions in the sense mode. The four Z mass blocks 23 form a differential detection in the sense mode. Finally, the magnitude of the angular velocity ω can be obtained by detecting the vibration displacement of the Z mass blocks 23 in the direction of 45°/135°.

Figure 4:
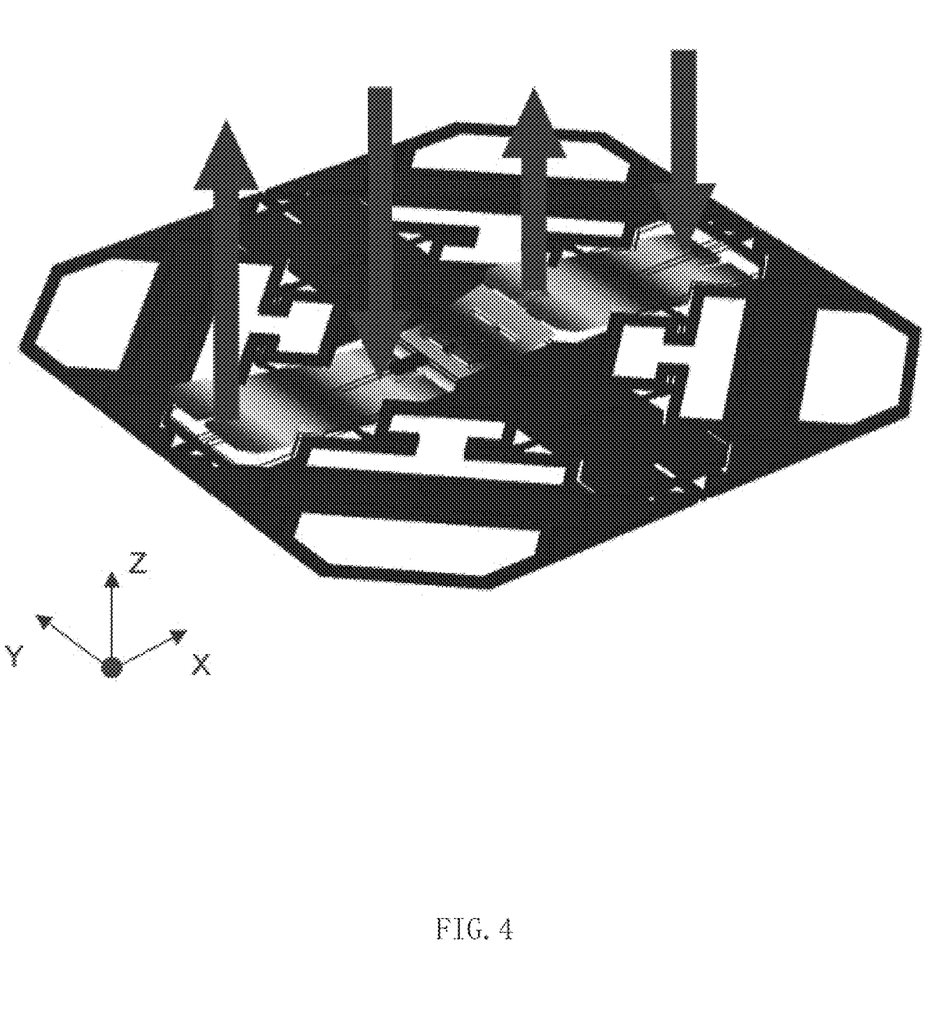
FIG. 4 is a view of the MEMS gyroscope in an X-axis sense mode according to an embodiment of the present application.

As shown in FIG. 4, when the gyroscope of the present application is subjected to an angular velocity ω in a plane along an X-axis (0°), according to the Coriolis principle, the angular velocity ω generates a Coriolis force along a Z-axis (orthogonal to the plane) direction, and the Coriolis force forces the gyroscope to generate vibration in an X-axis sense mode, so that the X mass blocks 21 inverse out of plane. Specifically, in the sense mode, the two X mass blocks 21 move in opposite directions to form a differential detection. Meanwhile, in the sense mode, the portions of each X mass block 21 on the inner side and the outer side of each side anchor point 12 move in opposite directions to form a differential detection. Finally, the magnitude of the angular velocity ω can be obtained by detecting the vibration displacement of the X mass blocks 21 along the Z-axis direction.

Figure 5:
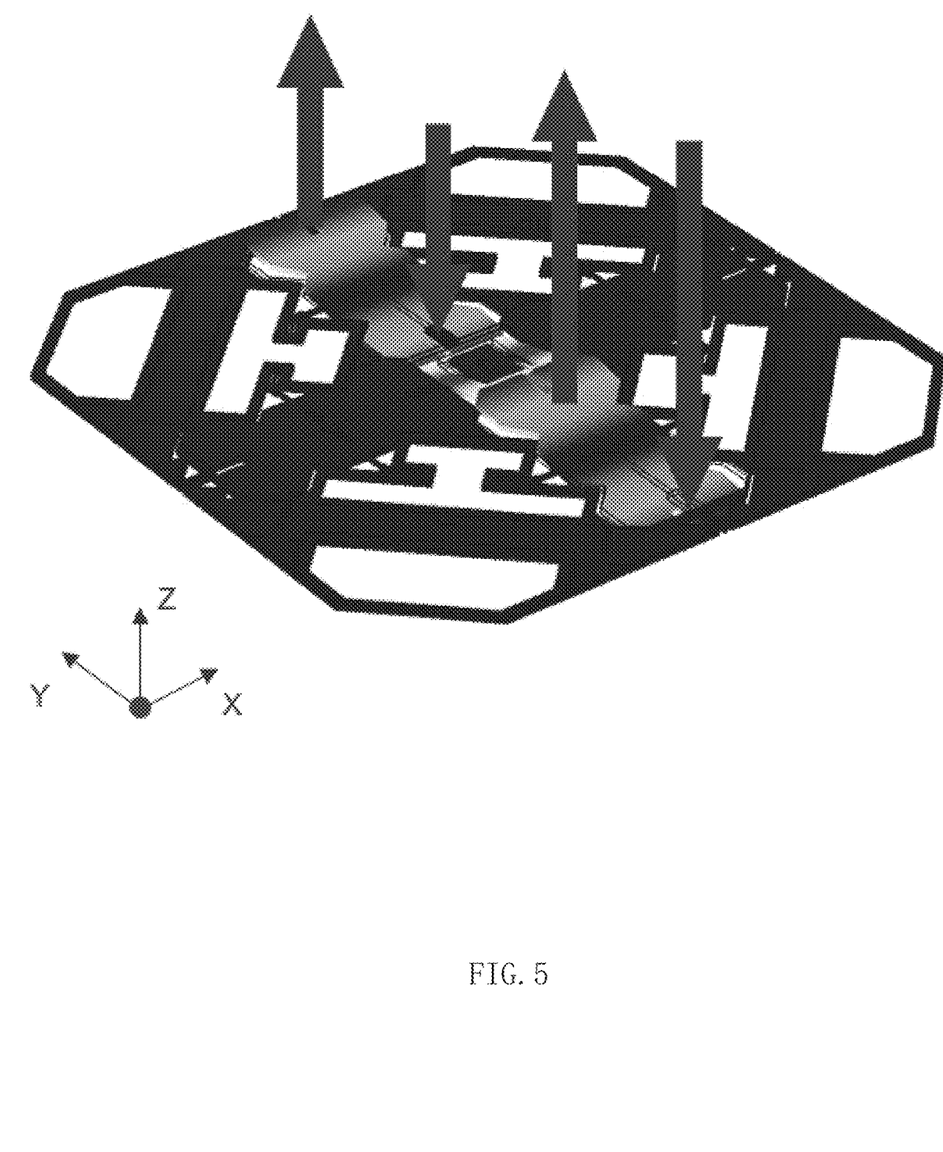
FIG. 5 is a view of the MEMS gyroscope in a Y-axis sense mode according to an embodiment of the present application.

Likewise, as shown in FIG. 5, when the gyroscope of the present application is subjected to an angular velocity ω in a plane along a Y-axis (90°), according to the Coriolis principle, the angular velocity ω generates a Coriolis force along a Z-axis (orthogonal to the plane) direction, and the Coriolis force forces the gyroscope of the present application to generate a vibration in a Y-axis sense mode, so that the Y mass blocks 22 inverse out of plane. Specifically, in the sense mode, the movement directions of the two Y mass blocks 22 are opposite to form a differential detection. Meanwhile, the movement directions of the portions of each Y mass block 22 at the inner side and the outer side of each side anchor point 12 are opposite to form a differential detection. Finally, the magnitude of the angular velocity ω can be obtain by detecting the vibration displacement of the Y mass blocks 22 in the Z-axis direction.

In practical engineering practice, the gyroscope has several capacitors, and the functions of the capacitors are as follows: (a) generate an external driving force required to force the gyroscope of the present application to drive the vibration in the drive mode; (b) detect the vibration displacement of the gyroscope along a direction of the vibration in the sense mode; (c) suppress an orthogonal error of the gyroscope.

Described above are only the embodiments of the present application. It should be pointed out that for those of ordinary skill in the art, improvements made without departing from the inventive concept of the present application shall belong to protection scope of the present application.

What is claimed is:

1. A fully decoupled three-axis MEMS gyroscope, comprising:
    an anchor point unit, comprising:
        an anchor point subunit located at a center of a rectangle; and
        four side anchor points respectively located between the central anchor point subunit and four sides of the rectangle and spaced apart from the central anchor subunit;
    a driving unit coupled with a sensing unit and configured to drive the sensing unit to move, comprising:
        four driving members respectively located at four sides of the rectangle, and annularly and symmetrically arranged around a center of the rectangle; one end of each driving member close to the center of the rectangle is elastically connected to the central anchor point subunit; an avoiding interval is formed between adjacent driving members, and four side anchor points are respectively located in the avoiding intervals; and
    the sensing unit elastically connected to the anchor point unit, comprising:
        two X mass blocks symmetrically and oppositely arranged in two of the avoiding intervals and elastically connected to two of the driving member;
        two Y mass blocks symmetrically and oppositely arranged in the other two of the avoiding intervals and elastically connected to two of the driving member;
        four Z mass blocks respectively located on an outer side of each driving member and elastically connected to the adjacent driving member; and
        four Z detection decoupling members respectively located on an outer side of each Z mass block and elastically connected to the adjacent Z mass block;
        wherein the adjacent Z detection decoupling members are elastically connected; an end of each X mass block close to the center of the rectangular and an end of each Y mass block close to the center of the rectangular are both elastically connected to the central anchor point subunit, and a central portion of each X mass block and a central portion of each Y mass block are elastically connected to a corresponding side anchor point, respectively.

2. The fully decoupled three-axis MEMS gyroscope of claim 1, wherein the central anchor point subunit comprises:
    a central anchor located at the center of the rectangle;
    a coupling structure surrounded and flexibly connected to the central anchor point, comprising:
        an inner coupling ring nested on the central anchor point; and
        an outer coupling ring nested on the inner coupling ring; and
    four first anchor points annularly arranged around the coupling structure and spaced apart from the coupling structure;
    wherein an inner side of the inner coupling ring is extended along a direction of a central line of the rectangle to form two inner coupling beams connected to the central anchor point; an inner side of the outer coupling ring is extended along a direction perpendicular to a straight line where the two inner coupling beams are located to form two outer coupling beams connected to the inner coupling ring; the four first anchor points are respectively located at an inner side of each driving member, and an outer wall of one end of each driving member close to each first anchor point is extended outwards to form a first connecting beam for connecting to the first anchor point.

3. The fully decoupled three-axis MEMS gyroscope of claim 2, wherein an outer side of each outer coupling ring close to each X mass block and each Y mass block is extended towards the corresponding X mass block and Y mass block to form a second flexible beam, and an end of each second flexible beam away from each outer coupling ring is connected to the corresponding X mass block and Y mass block.

4. The fully decoupled three-axis MEMS gyroscope of claim 1, wherein the four side anchor points are respectively located at middle positions of the corresponding X mass blocks and Y mass blocks; each X mass block and each Y mass block are provided with a first connecting groove at the corresponding side anchor point; the X mass blocks and the Y mass blocks are each extended from the first connecting groove to form a first flexible beam connected to the corresponding side anchor point, and the first flexible beam is bent in a lengthwise direction of the first connecting groove.

5. The fully decoupled three-axis MEMS gyroscope of claim 1, wherein outer walls of two sides of each driving member are respectively extended towards each X mass block and each Y mass block to form a third flexible beam connected to the X mass block or the Y mass block.

6. The fully decoupled three-axis MEMS gyroscope of claim 1, wherein two sides of an outer wall of each driving member close to one end of the corresponding Z mass block are extended towards the Z mass block to form a first guide beam, and an end of the first guide beam away from the driving member is connected to the Z mass block.

7. The fully decoupled three-axis MEMS gyroscope of claim 1, wherein the anchor point unit further comprises four second anchor points respectively provided between each Z mass block and a corresponding driving member, wherein an outer wall of one end of each driving member close to each Z mass block is extended outwards to form a second connecting beam connected to each second anchor point.

8. The fully decoupled three-axis MEMS gyroscope of claim 1, wherein an outer wall of one end of each Z detection decoupling member close to each Z mass block is extended outwards to form a third connecting beam connected to the Z mass block; the anchor point unit further comprises decoupling member anchor points respectively located at two ends of each Z detection decoupling member, and two sides of each Z detection decoupling member is extended outwards to form a second guide beam having a bending portion and connected to the decoupling member anchor points.

9. The fully decoupled three-axis MEMS gyroscope of claim 1, wherein the anchor point unit further comprises corner anchor points respectively located between every two adjacent Z detection decoupling members, and two adjacent Z detection decoupling members are extended to form a fourth flexible beam connected to the corner anchor point located between the two adjacent Z detection decoupling members.

10. The fully decoupled three-axis MEMS gyroscope of claim 1, wherein the driving members and the Z detection decoupling members are all frame structures; the fully decoupled three-axis MEMS gyroscope further comprises an in-plane driving transducer embedded in each frame structure of each driving member, and an in-plane Z detection transducer embedded in each frame structure of each Z detection decoupling member; the fully decoupled three-axis MEMS gyroscope further comprises out-of-plane X detection transducers spaced apart from the X mass blocks, and out-of-plane Y detection transducers spaced apart from the Y mass blocks.

* * * * *